July 29, 1947.    N. J. POWLICK    2,424,632
PONY-CYCLE FOR CHILDREN
Filed May 7, 1945    2 Sheets-Sheet 2

INVENTOR;
N.J. POWLICK
BY
ATTORNEY

Patented July 29, 1947

2,424,632

UNITED STATES PATENT OFFICE 2,424,632

PONY CYCLE FOR CHILDREN

Nicholas J. Powlick, Chicago, Ill.

Application May 7, 1945, Serial No. 592,453

6 Claims. (Cl. 280—1.13)

This invention relates to pony-cycles for children, and is in the nature of a combined velocipede and hobby horse or pony.

The primary object of the invention is to provide a velocipede or the like vehicle having outer coverings or configurations in simulation of a pony or horse, the said vehicle being pedal driven by the rider as seated upon the pony or horse, and having means incorporated in the unit for causing the pony or horse to rock up and down alternately at its ends, in simulation of a galloping action or movement of the pony or horse.

Another object of the invention is to provide in a wheeled vehicle of the kind referred to and which is covered and configured in outer appearance to represent a horse or pony, the vehicle having a steerable front wheel controlled by handle bars convenient to the hands of the rider as seated upon the back of the pony or horse and being driven by a pedal operated sprocket wheel and sprocket chain leading therefrom to a complemental sprocket wheel upon the axle of the rear wheels, means in the way of a cam wheel mounted upon the axle of the pedal operated sprocket wheel and a rider bar supported freely atop the cam wheel for causing the body of the vehicle to oscillate vertically in simulation of the movements of a horse or pony in motion.

Still another object of the invention is to provide a velocipede carried upon wheels and including a steerable front wheel controlled by handle bars convenient to the reach of a rider seated upon the vehicle, the vehicle being propelled by means of a pedal operated sprocket wheel journaled across the frame of the vehicle below the rider's seat, and a complemental sprocket wheel upon the axle of the rear wheels of the vehicle the two sprocket wheels in longitudinal alignment and operatively connected by a sprocket chain passed thereover, and means for causing the rider's seat to oscillate vertically in simulation of the movements of a horse or pony in travel.

With the stated objects in view, together with such other and additional objects and advantages as may appear from the following specification, attention is directed to the accompanying drawing as constituting a part of this specification, and wherein.

Figure 1:
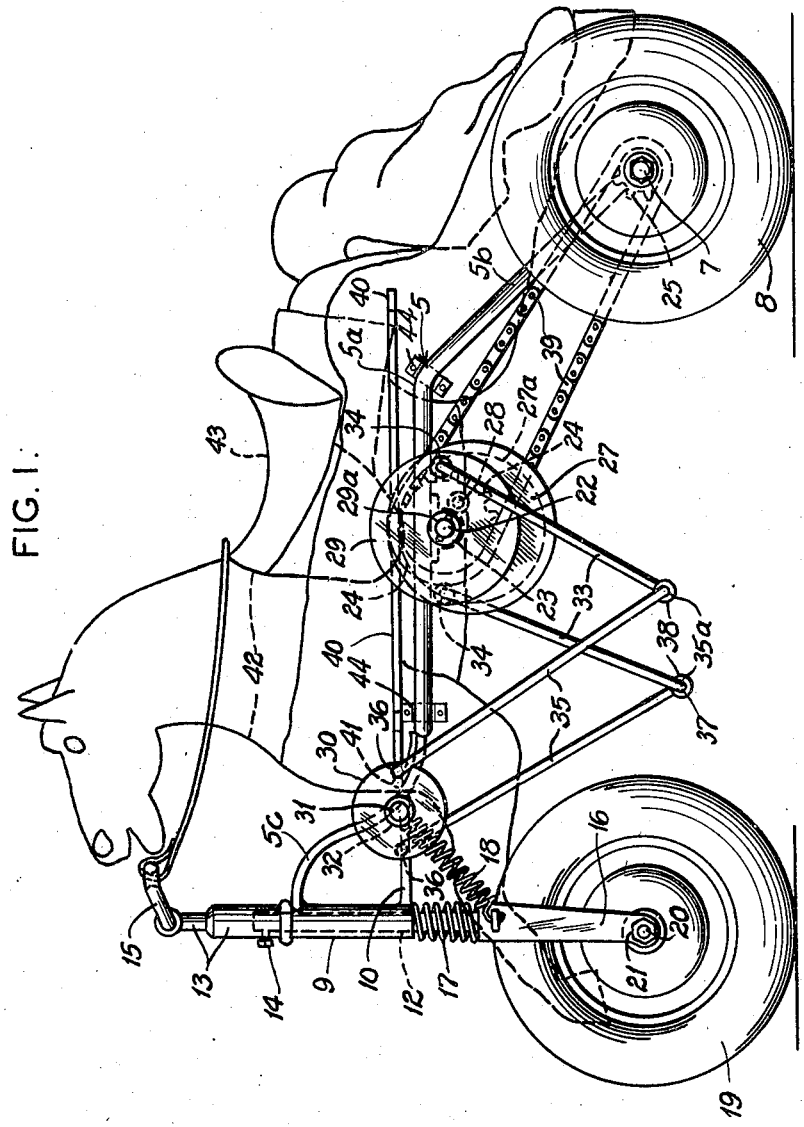
Figure 1 is a side elevational view of a pony-cycle constructed in accordance with this invention, showing also in full lines the figure of a pony as mounted on the vehicle, with saddle and trappings on the pony, parts of the structure being broken out to show the construction and method of attachment of the figure to the frame of the vehicle.

The invention comprises or includes an elongated frame represented generally at 5, and which includes a bar bent medially upon itself to provide a pair of laterally aligned bars 5a suitably spaced apart, turned downwardly and flared outwardly at their rear ends as at 5b, and which at their ends support laterally aligned bearings 6 through which is journaled the ends of a driven shaft or axle shaft 7 having the traction wheels 8 keyed or anchored to the outer ends thereof in conventional manner. The forwardly disposed curved or bight portion of the bar which forms the lateral extensions 5a, is joined to the rear end of the element 5c, the up-curved forward end thereof being anchored to the steering shaft sleeve 9 in a conventional manner. No invention is claimed in respect of this particular method of making said connection. An additional supporting brace 10 joins the lower end of the sleeve 9 with the frame proper, and a cross brace 11 laterally connects the bars 5a. A steering shaft or rod 12 is journaled through the sleeve 9 and a handle bar shaft 13 is seated by its lower tubular end over the upper protruded end of the steering rod 12 and is locked thereto by means of a set-screw 14 threadedly passed through the sleeve 9 against the end of the steering rod. Conventional steering handles 15 extend laterally through the upper end of the shaft 13 and the tubular lower end of this shaft provides a pivotal bearing at the upper end of the sleeve 9 for the rotation of the steering rod 12. A steering wheel fork 16 is anchored to the lower end of the steering rod 12, and a suitably heavy expansion coil spring 17 encircles the rod 12 and is braced at its ends between the shoulder of the fork and the lower end of the sleeve 9, whereby these elements are held in proper tensioned relation and frictional engagement. A pair of retractile coil springs 18 laterally connect at their ends the fork 16 with the frame 5, at each side, for resiliently holding the steering fork to its normal straight-away position, subject to lateral rotation however to either side in the operation of steering the vehicle. A steering wheel 19 is mounted within the fork 16 upon a stub-shaft 20 to which it is keyed, the ends of this shaft being journaled through the transversely aligned lower ends of the fork, and through ball bearings (not shown) in the usual manner, and if desired. This steering wheel is locked in place by means of nuts 21 threaded upon the outer ends of the shaft.

A drive shaft 22 is extended medially and transversely through the frame 5, the ends thereof being journaled through hangers 23 welded or otherwise anchored to the under sides of the spaced bars 5a of the frame, in exact transverse alignment. Conventional ball bearings (not shown) may be incorporated within the hangers 23 for the shaft 22 to turn in, and conventional braking devices (not shown) may also be incorporated if desired. A drive sprocket wheel 24 is rigidly keyed or otherwise anchored upon the shaft 22 adjacent one end thereof (here shown as at the right hand end) and inside the bars 5a, and a smaller driven sprocket wheel 25 upon its hub 25a is rotatably mounted upon the rear axle shaft 7 in direct longitudinal alignment with the drive sprocket wheel 24, any conventional device being employed for preventing lateral slippage of the hub 25a along the shaft 7. A clutch member 26 is splined as at 26a upon the shaft 7 for lateral sliding movement thereon, but locked by the splined mounting against rotation on the shaft. The hub 25a and the clutch member 26 are formed upon their adjacent lateral sides with interclutch meshing clutch fingers 25b, 26b, and whereby when these elements are meshed the rear axle shaft 7 and wheels 8 will rotate in unison with the drive sprocket wheel 24, but will not rotate when these elements are not thus meshed.

Figure 2:
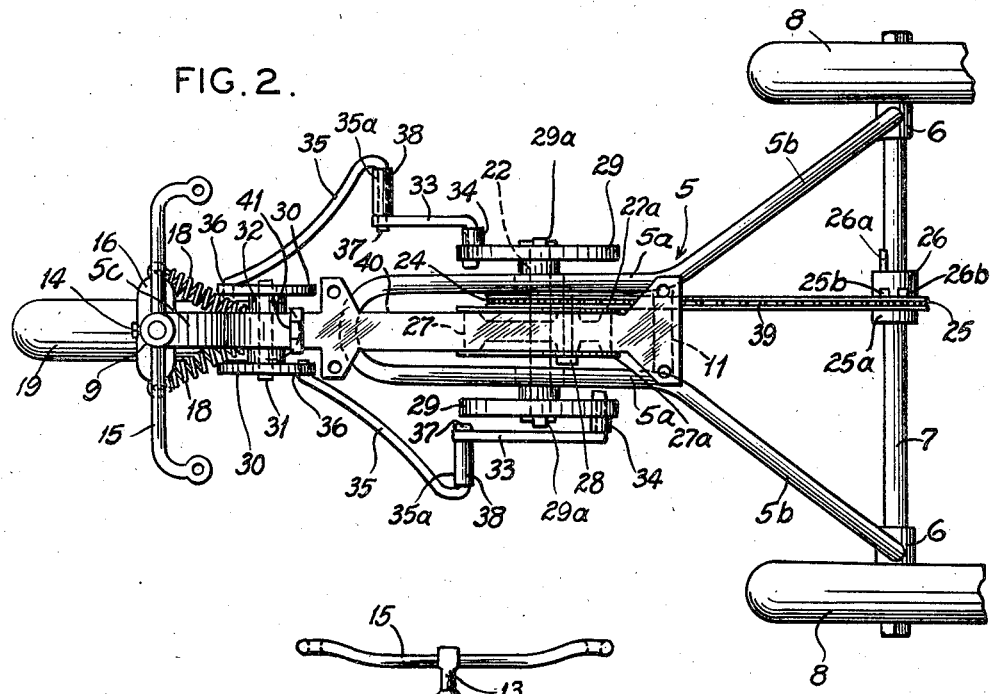
Figure 2 is a top plan view of the essential parts of the vehicle, the outer coverings thereof being omitted, which outer coverings complete the representation of a pony or horse.
Figure 3:
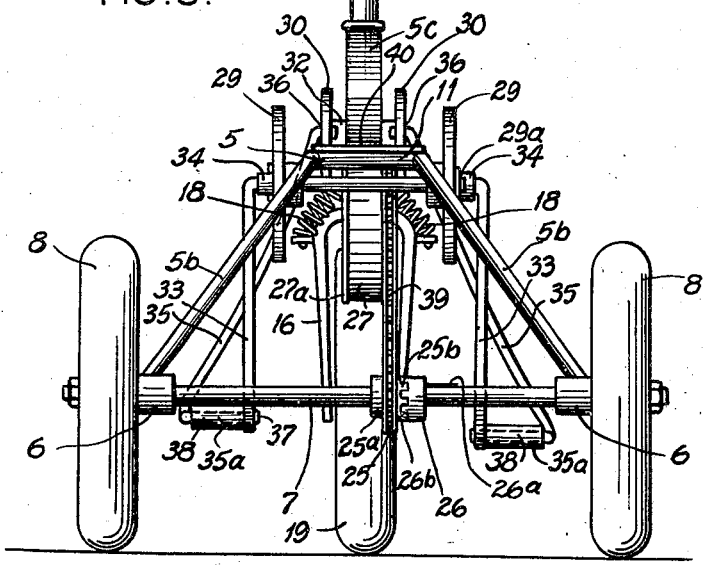
Figure 3 is a rear elevational view of the assembly of Figure 2.

A laterally flanged cam-wheel 27 the flanges thereof being indicated at 27a is eccentrically and rotatably mounted upon the drive shaft 22 inside the bars 5a and contiguous with the inner side of the drive sprocket wheel 24, this cam-wheel having a substantially broad periphery as shown and arranged to rotate independently of the drive sprocket wheel 24. However the cam-wheel may be releasably locked to the drive sprocket wheel by means of one or more lock bolts or pins 28 passed transversely through the cam-wheel in spaced relation outwardly of the drive shaft 22 and threaded at its outer end into the said drive sprocket wheel 24 as shown in Figure 2. Thus with the cam-wheel locked as described to the drive sprocket wheel these two elements will rotate together, otherwise and with the lock bolt or bolts removed, the cam-wheel will not rotate with the drive sprocket wheel. A pair of circular drive plates 29 of equal diameter are rigidly keyed upon the extended outer ends of the drive shaft 22, at the centers of the plates, as indicated at 29a. A smaller pair of pedal supporting plates 30, also circular in form, are rigidly keyed upon the ends of a short shaft 31 passed centrally through the plates, the said shaft being journaled transversely under the member 5c, as indicated at 32. A pair of rear pedal bars 33 are pivotally supported at their upper ends upon wrist pins 34 passed through the drive plates 29 at each side of the machine and at opposite margins of the respective plates, as clearly shown in Figure 2. A pair of curved and forwardly positioned pedal bars 35 are pivotally connected at their upper inturned ends to the margins of the pedal supporting plates 30 at each side of the machine being passed pivotally through apertures or bores in opposite margins of the respective plates as indicated at 36 in Figure 2. The lower ends of the forward pedal bars 35 are turned sharply inward to form pedals or foot rests 35a of sufficient width for the purpose, and the extremities of these pedals 35a are passed freely through bores in the lower ends of the rear pedal bars 33 and then upset, as indicated at 37. Short tubular rollers 38 are freely mounted upon the pedals or foot rests 35a for facilitating the operation of the pedals. A sprocket chain 39 is trained over the two longitudinally aligned sprocket wheels 24 and 25 for transmitting motion from the former to the latter for driving the machine upon the road.

An elongated and flat rider bar 40 is hinged by its forward end as indicated at 41 forwardly of the frame 5 and at the upper side thereof, and the rear end of this bar is positioned freely upon the cam-wheel 27, between the flanges 27a thereof, as shown in Figure 2. Thus with the cam-wheel locked to the drive sprocket wheel 24 by means of the lock pin or pins 28 in manner above referred to, the resultant action upon the rider bar 40 as the machine is pedalled along a road, is to cause this bar to alternately to rise and fall in an undulatory manner, corresponding to the movement of the back of a horse in motion. And in order to complete the similitude of this vehicle or pony-cycle to the motions and likeness of a pony or horse, outer coverings 42 of any suitable fabric or structure and shaped and configured to represent such horse or pony, are mounted upon and laterally over the frame 5 as indicated in full lines in Figure 1, the said covering including a saddle 43 upon the back of the equine figure for seating the rider of the vehicle. The horse itself as represented in the drawing, is secured to the frame of the vehicle, by means of the loops 44, or other conventional method.

In use the pedal bars 33 and 35 rotate or move in complete cycles at their upper ends as pivotally connected with the drive plates 29 and the pedal supporting plates 30, and with the cam-wheel 27 and drive sprocket wheel 24 locked together in the manner specified, and the rear clutch elements intermeshed, then as the vehicle is propelled by the rider in the saddle, by operating the pedals of the machine, the movements of a pony or horse in travel would be fairly reproduced. With the cam-wheel and drive sprocket wheel disengaged by removal of the bolt or bolts 28, then the cam wheel would merely ride freely on the drive shaft 22 and the rider bar 40 would not oscillate but would remain stationary, and the vehicle would travel along in manner of a conventional velocipede. On the other hand, with the clutch elements 25b, 26b, of the rear axle shaft 7 disengaged, then the vehicle would be readied for coasting, as the drive shaft 22 would be inoperative for propelling the vehicle. The pedals or stirrups or foot rests 35a are moved up and down by the feet of the rider in the saddle 43 and the bars or rods 33 and 35 likewise move up and down alternately at opposite sides of the machine, thus propelling the machine. The drive bars or rods 33 and 35 also have a limited reciprocal movement, in simulation of the movements of the piston rods of a locomotive. The machine may also be used as a stationary exerciser by disengaging the clutch elements of the rear axle shaft but leaving the cam-wheel and drive sprocket wheel operatively connected by means of the bolt or bolts as above pointed out. This would provide for vertical oscillation of the saddle, without any travel of the vehicle.

While I have here shown and described a specific embodiment of the pony-cycle, and specific structural features thereof, it is to be understood that the structures as shown may be changed

I claim:

1. A vehicle of the kind described, comprising a wheel-borne frame, a drive shaft journaled medially and transversely through the frame, a sprocket drive wheel keyed upon the shaft, a cam wheel eccentrically and freely mounted on the shaft adjacent to the drive wheel, means for releasably locking the cam wheel to the sprocket drive wheel, circular drive plates centrally keyed upon the outer extended ends of the drive shaft, a rear axle shaft journaled through the frame, a driven sprocket wheel upon the rear axle shaft of the vehicle in longitudinal alignment with the sprocket drive wheel, a sprocket chain trained over the sprocket drive wheel and the driven sprocket, a rider bar hinged at its forward end to the forward portion of the frame and trained rearwardly over the periphery of the cam wheel, pedal bars pivotally connected at their upper ends to opposite margins of the circular drive plates, foot pedals at the lower ends of the pedal bars.

2. In a vehicle of the kind described and including an elongated frame carried upon a steerable front wheel and a pair of laterally spaced rear wheels mounted upon a rear axle shaft, a drive shaft journaled medially and transversely through the frame, a sprocket drive wheel keyed upon the drive shaft, a driven sprocket wheel on the rear axle shaft in longitudinal alignment with the sprocket drive wheel, and a sprocket chain trained over the two aligned sprocket wheels, a cam-wheel eccentrically and freely mounted upon the drive shaft adjacent to the sprocket drive wheel, means for releasably locking the cam wheel to the sprocket drive wheel, circular drive plates keyed upon the outer extended ends of the drive shaft, pedal controlled means connected with the drive plates for driving the machine, a rider bar hinged at its forward end to the forward portion of the frame and extended rearwardly over the top of the cam wheel, whereby with the cam-wheel locked to the sprocket drive wheel and with the vehicle in motion the said rider bar will be caused to oscillate vertically.

3. In a vehicle according to claim 2, means for holding the rear end of the rider bar slidably in place at the top of the cam wheel, the said pedal controlled means comprising pedal bars pivoted at their upper ends to the said circular drive plates at opposite sides of the machine and to opposite margins of the plates, and foot pedals at the lower ends of the pedal bars, whereby a rider may operate the machine.

4. In a vehicle according to claim 2, the said pedal controlled means comprising pedal bars pivoted at their upper ends to the said circular drive plates at opposite sides of the machine, outwardly extended foot pedals at the lower ends of the pedal bars, a short shaft journaled transversely at the front end of the vehicle, a pair of circular pedal supporting plates rigidly keyed upon the ends of said shaft, a pair of curved and forwardly positioned pedal bars pivotally connected at their upper inturned ends to the margins of the circular pedal supporting plates at each side of the machine, the lower and outturned extremities of the said forwardly positioned pedal bars being turned sharply and laterally inward and thereat joined to the outer ends of the foot pedals of the first mentioned pedal bars.

5. In a vehicle according to claim 2, the said pedal controlled means comprising a pair of rearwardly disposed pedal bars pivoted at their upper ends to opposite margins of the said circular drive plates at opposite sides of the machine, a short shaft journaled transversely at the front end of the vehicle, a pair of circular pedal supporting plates rigidly keyed upon the ends of said shaft, a pair of curved and forwardly positioned pedal bars pivotally connected at their upper inturned ends to opposite margins of the said circular pedal supporting plates and in co-operative relation to the mounting of the upper ends of the rearwardly positioned pedal bars to the said circular drive plates, the lower and out-turned ends of the forwardly positioned pedal bars being turned sharply and laterally inward at each side of the machine and thereat pivotally connected to the lower ends of the rearwardly disposed pedal bars, and thereby forming and providing foot pedals for the use of the operator of the machine.

6. In a vehicle according to claim 2, the said pedal controlled means as connected with the said drive plates for driving the machine including a pair of pedal bars pivotally supported at their upper ends at the outer sides of the circular drive plates and at opposite margins thereof at each side of the machine, and foot pedals mounted at the lower ends of the said pedal bars.

NICHOLAS J. POWLICK.

REFERENCES CITED

The following references are of record in the file of this patent:

UNITED STATES PATENTS

| Number | Name | Date |
|---|---|---|
| 626,297 | Peterson | June 6, 1899 |
| 838,381 | Carroll | Dec. 11, 1906 |
| 888,666 | Speice | May 26, 1908 |
| 1,379,604 | Ajouz | May 31, 1921 |
| 1,381,954 | Zimmerman | June 21, 1921 |
| 1,396,475 | Tracey | Nov. 8, 1921 |
| 1,519,493 | Harker | Dec. 16, 1924 |
| 1,625,337 | Shelley | Apr. 19, 1927 |